(12) United States Patent
Bender et al.

(10) Patent No.: US 6,195,700 B1
(45) Date of Patent: Feb. 27, 2001

(54) APPLICATION PROTOCOL DATA UNIT MANAGEMENT FACILITY

(75) Inventors: David Michael Bender; Michael Joseph Reynolds, both of Austin; Paul Stuart Williamson, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/196,905

(22) Filed: Nov. 20, 1998

(51) Int. Cl.$^7$ .................................................. G06F 13/00
(52) U.S. Cl. .......................... 709/230; 709/328; 710/105
(58) Field of Search ..................... 709/220–225, 709/230–237, 311, 320, 328–332; 705/14; 710/1–2, 72–74, 101–106; 713/201

(56) References Cited

U.S. PATENT DOCUMENTS

| | | | |
|---|---|---|---|
| 5,935,249 | * 8/1999 | Stern et al. | 713/201 |
| 6,005,942 | * 12/1999 | Chan et al. | 380/25 |
| 6,014,748 | * 1/2000 | Tushie et al. | 713/200 |
| 6,052,720 | * 4/2000 | Traversat et al. | 709/220 |
| 6,101,477 | * 8/2000 | Hohle et al. | 705/1 |
| 6,112,987 | * 9/2000 | Lambert et al. | 235/380 |
| 6,119,157 | * 9/2000 | Traversat et al. | 709/220 |

FOREIGN PATENT DOCUMENTS

| | | | |
|---|---|---|---|
| 955578A1 | * 11/1999 | (EP) | . |
| 2326315A | * 12/1998 | (GB) | . |
| 9817029 | * 4/1998 | (WO) | . |

* cited by examiner

*Primary Examiner*—Christopher B. Shin
(74) *Attorney, Agent, or Firm*—Leslie A. Leeuwen; Felsman, Bradley, Vaden, Gunter & Dillon, LLP

(57) ABSTRACT

The present invention describes a facility which may be used in conjunction with SmartCard technology. Application Protocol Data Units (APDUs) are used to communicate with SmartCards. The management of these units is the primary focus and advantage of this facility. Smartcard environments can require that the APDUs conform to an environment specific format, and they can have different methods of sending information to and from a SmartCard. Other tools exist which assist in creation of ADPUs for SmartCard communication, but they are most likely tied to a single SmartCard environment. Application Protocol Data Unit—Management Facility (AMF) has numerous advantages over other APDU generation tools and are described.

20 Claims, 3 Drawing Sheets

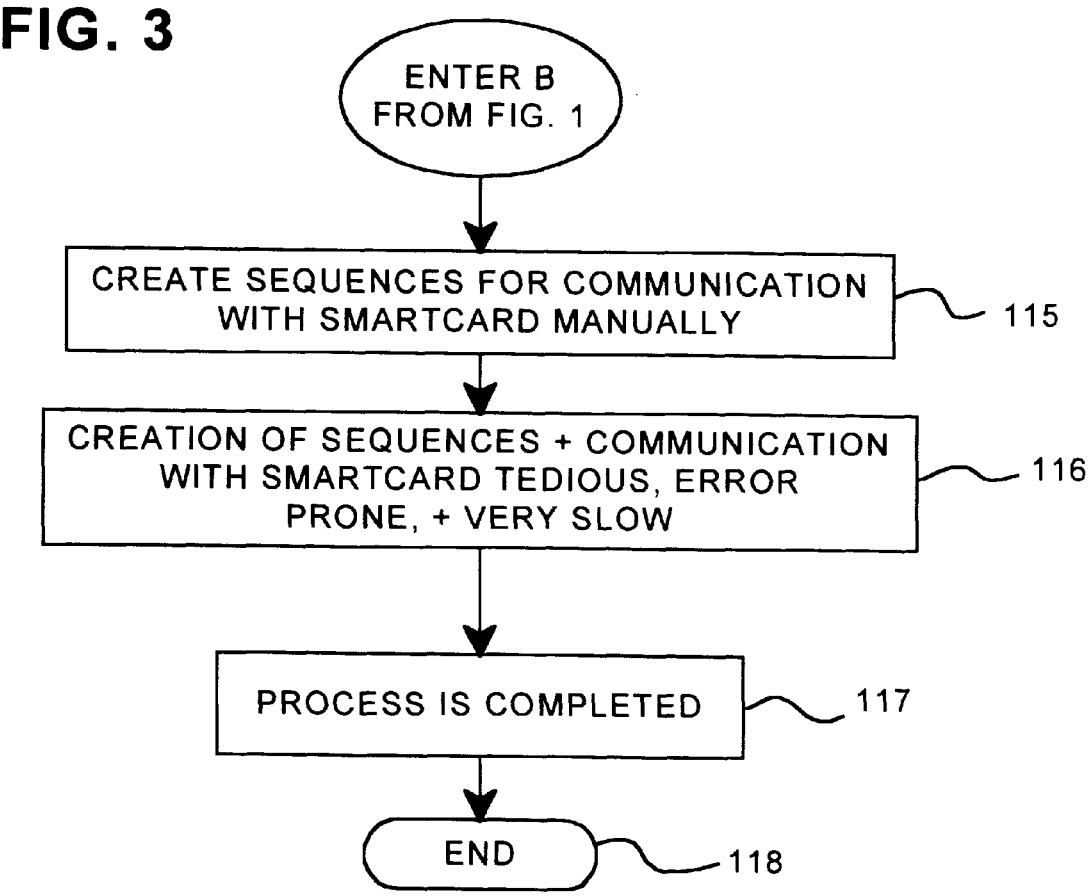

APPLICATION PROTOCOL DATA UNIT MANAGEMENT FACILITY

TECHNICAL FIELD

The present invention describes a facility which may be used in conjunction with SmartCard technology. Application Protocol Data Units (APDUs) are used to communicate with Smart Cards. The advantages of the Application Protocol Data Unit—Management Facility (AMF), as opposed to other APDU generators, represents the primary focus of the present invention.

BACKGROUND OF THE INVENTION

The APDUs Management Facility is 100% pure Java tool, written to increase productivity when developing data packages to communicate with SmartCards (including JavaCard™). An APDU is a data package consisting of strings of bytes that are sent back and forth between a SmartCard and a Card Acceptance Device (such as a card reader or terminal). The format and standards for APDUs are defined in the International Organization for Standardization (ISO) 7816-4. The information contained with an APDU consists of hexadecimal data representing the APDU command type, parameters and command data.

Regarding APDU message structure, a step in an application protocol consists of sending a command, processing the command in the receiving entity and sending back a response. Therefore, a specific response corresponds to a specific command, referred to as a command/response pair. An APDU contains either a command message or a response message, sent from the interface device to the card or conversely. In a command/response pair, the command message and response message may contain data.

Messages are transported between the terminal and the card according to the transmission protocol selected at the ATM. The command message sent from the applications layer and the response message returned by the card to the applications layer are the APDUs. A specific response corresponds to a specific command. These are referred to as APDU command/response pairs. In an APDU command/response pair, the command message and the response message may contain data.

Creating sequences of APDUs for communication with a SmartCard involves dealing with bit definitions and hexadecimal data, and can be extremely tedious and error prone.

At this juncture it would be desirable to define certain terms before proceeding with the description of the present invention. "Smart Card" technology can be defined as follows: a credit card size token that contains a microprocessor and memory circuits used for authenticating a user of a computer. When used for authentication proposes, a smart card is very often paired with a personal identification number (PIN); the combination between what you have (the token) and what you know (the PIN) is considered to establish strong authentication.

In computers and electronics, a SmartCard can be considered as a circuit board with built-in logic or firmware that gives it some kind of independent decision making ability. In banking and finance a SmartCard is used for authentication proposes. A SmartCard is very often paired with a PIN; the combination between what you have (the token) and what you know (the PIN) is considered to establish strong authentication.

As noted, a SmartCard is a card that is embedded with either a microprocessor and a memory chip or only a memory chip with nonprogrammable logic. The microprocessor card can add, delete and otherwise manipulate information on the card, while a memory chip card, such as a phone card, can only undertake a predefined operation.

SmartCards, unlike magnetic strip cards, can carry all necessary functions and information on the card. Therefore, they do not require access to remote databases at the time of transactions.

Today there are three categories of SmartCards, all of which are evolving rapidly into new markets and applications. The first is the Integrated Circuit (IC) Microprocessor Cards or "Chip" cards. They offer greater memory storage and security than the magnetic strip card. Chip cards can also process data on the card. The second type of card is the Integrated Circuit (IC) Memory Card that holds 1–4 KB of data, but does not contain any processor on the card to manipulate data. Thus, IC Memory Cards are dependent on the card reader for processing and are suitable for uses where the card performs a fixed operation. The third type of SmartCard is an Optical Memory Card. These cards can store up to 4KB of data. But, once written, the data cannot be changed or removed. Thus, this type of card is ideal for record keeping. Currently, these cards have no processor in them.

Regarding "JavaCard", it is a SmartCard that is capable of running programs written in Java.

With respect to the term "Protocol", it can be defined as follows: in data communications and networking, a standard that specifies the format of data, as well as the rules to be followed. Networks could not easily be efficiently designed or maintained without protocols. A protocol specifies how a program should prepare data so that it can be sent on to the next stage in the communication process. For example, e-mail programs prepare messages so that they conform to prevailing Internet mail standards, which are recognized by every program that is involved in the transmission of mail over the network.

The term "String", in programming, is a series of alphanumeric characters or unit data other than a numeric value. In data structures a string is a sequence of characters usually representing human readable text.

The term "Hexadecimal" is used throughout the description of the present invention. It is defined as a numbering system that uses a base (radix) of 16. Unlike decimal numbers (based 10) hexadecimal numbers include 16 digits: 0, 1, 2, 3, 4, 5, 6, 7, 8, 9, A, B, C, D, E and F. Although binary numbers are ideally suited to the devices used in computers, they are inconvenient and hard to read. Binary numbers grow long quickly; for example, 16 is 10000 in binary and 10 in hexadecimal format. Therefore, programmers use hexadecimal numbers. A byte is conveniently represented as two consecutive hexadecimal numbers.

"SmartCard" environments can require that the APDUs conform to an environment specific format, and they can have different methods of sending information to and from a SmartCard. Other tools exist which assist in creation of ADPUs for SmartCard communication, but they are most likely tied to a single SmartCard environment. Application Protocol Data Uni—anagement Facility (AMF) has numerous advantages over other APDU generation tools and will be described below.

SUMMARY OF THE INVENTION

As noted above, creating sequences of APDUs for communication with a SmartCard involves dealing with bit definitions and hexadecimal data, and can be extremely tedious and error prone. The APDU—Management Facility (AMF), the basis of the present invention, allows the user to create a sequence of APDUs via a "high level user interface", making this task much easier and far less error prone.

The APDU sequences, which are created by the user, are saved in an intermediate form that is not tied to any specific SmartCard environment. The architecture of the serialized file is open, so any SmartCard environment can make use of the APDU—Management Facility (AMF) output. For proof concept, AMF includes an export facility whereby the user may export an APDU sequence as a JavaCard 2.0 simulator Script file.

BRIEF DESCRIPTION OF THE DRAWINGS

FIG. 3 merely depicts the sequence when AMF is not employed, where the user creates sequences for communication with SmartCard manually.

DETAILED DESCRIPTION OF THE PREFERRED EMBODIMENTS

Since the APDU—Management Facility (AMF) is not tied to any specific SmartCard environment; rather it has been developed to be an open architecture tool that can be easily plugged into a SmartCard environment. "Open architecture" is defined as any computer or peripheral design that has published specifications. A published specification lets third parties develop add on software for a computer or device.

Figure 2:
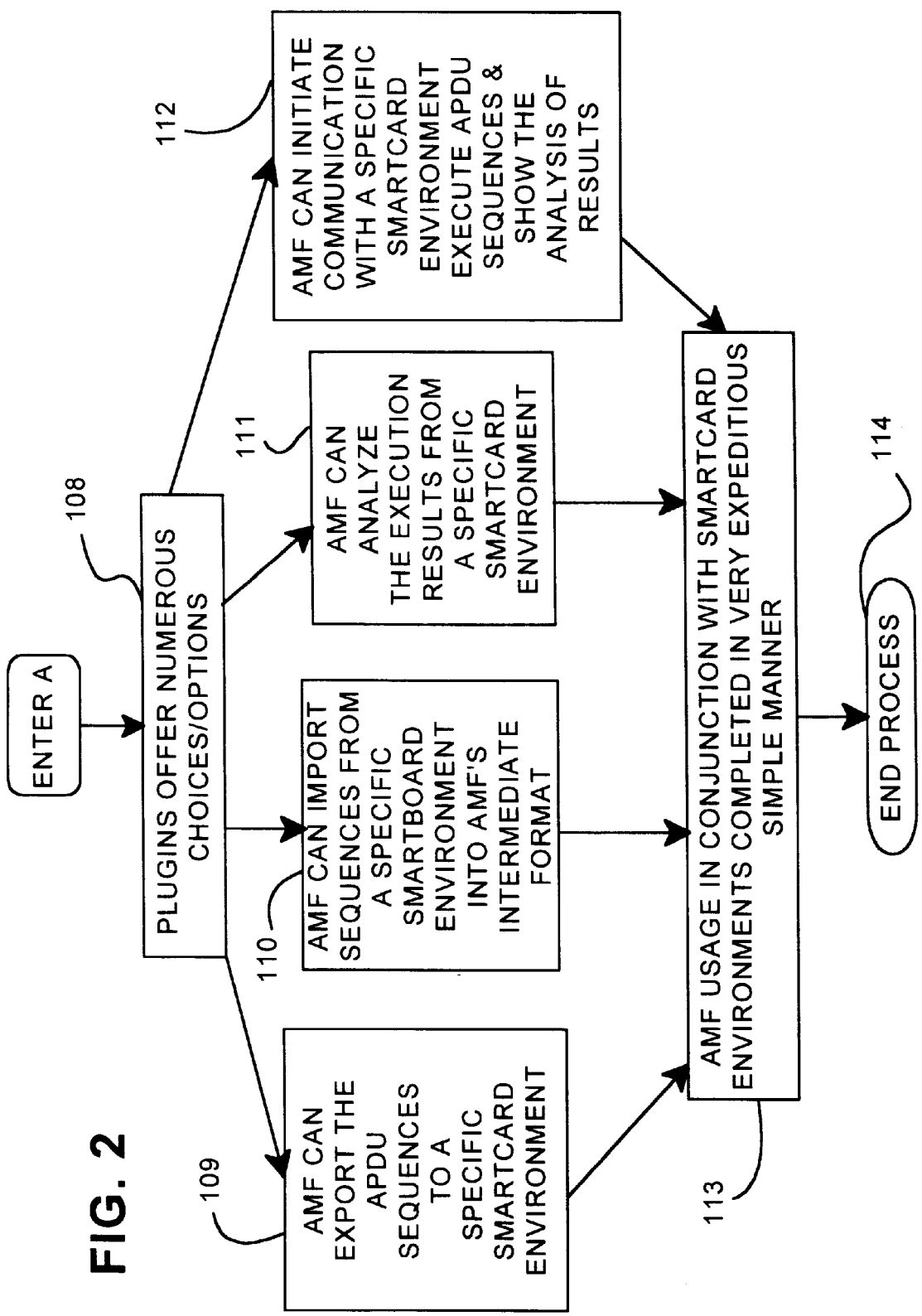
FIG. 2 is a continuation of FIG. 1 depicting the expeditious completion of the process; which is communicating with a SmartCard employing the Application Protocol Data Unit—Management Facility (AMF)

Plug-ins for AMF are software components written to be used by AMF to expand on functionality of AMF by using its intermediate format for APDU sequences. A plug-in, for example, can be an "import" plug-in, "export" plug-in, an "analysis" plug-in or an "execution" plug-in. These four types of plug-ins match the four main operations performed by AMF after a user has created an APDU sequence as shown in the flowchart of FIG. 2. As proof-of-concept, AMF provides several of these plug-ins for JavaSoft's JavaCard 2.0 Reference implementation (a specific SmartCard environment, which is a PC-based simulator).

A SmartCard environment could be a Real Point of Sale Card Terminal and an actual SmartCard implementation, or a PC-based simulator.

APDU—Management Facility (AMF) contains an initial set of functionality which immediately enhances user productivity. These include the following:

APDU Template Creation and Maintenance
Sample APDU Template File
High level Creation and Maintenance of APDU Sequences from APDU Templates
Exporting of JavaCard 2.0 Simulator Script Files
Open interface Java Application Access to AMF's APDU Sequence files Further enhancements are envisioned and represent a significant portion of this application's value. These include:

High level User Interface for creating APDU Templets.
Further Open Interface Java Application Access to AMF's Exporting/Importing Actions.
APDU Sequence Communication Analysis (Pass/Fail, Highlighting of Failures, etc.)
APDU Sequence Communication Runs Activated from AMF (Single or Batch)
Undo/Redo of Isolated Actions
Conditional Sequence Processing
Invocation of Actual Java Code between sequence steps
Full Support for T0/T1 Protocols
Importing of JavaCard Simulator Script Files for Incorporation with an AMF Sequence File Library
Optional Encryption and MACing of APDUs
Real Time Communication Stepping/Debugging
APDU Sequence Calls to other APDU Sequences
Various levels Find/Find Next Support
Printing of AMF Information
Related Product Help Application Protocol Data Unit—Management Facility (AMF) allows a user to create APDU sequences using high level concepts rather than forcing the user to work with bit and hexadecimal information. For example, the user can create an "initialized" APDU without knowing the hexadecimal information for the specific APDU. Instead, the user works with plain text selections and ASCII data that is then translated into correct APDU to be sent to the SmartCard.

AMF's High Level APDU sequences are easily maintained via user interface techniques which are widely understood and accepted. Application Protocol Data Unit—Management Facility (AMF) can be used to create environment specific (JavaCard 2.0 Simulator) communication APDU sequences from internal representations.

Since Application Protocol Data Unit—Management Facility (AMF) is written in 100% pure Java, this tool will run on any operating system which supports Java.

The future enhancements basically position Application Protocol Data Unit—Management Facility (AMF) as a centralized, full function APDU—Management Facility for APDU communication/analysis with a wide variety of SmartCard solutions.

Application Protocol Data Unit—Management Facility (AMF) has the following advantages over other APDU generation tools.

Since Application Protocol Data Unit—Management Facility (AMF) is written in 100% pure Java, it is platform independent.

Application Protocol Data Unit—Management Facility (AMF) stores APDU sequences in Java serialized files, making them SmartCard environment independent.

The APDU sequence files have open interface allowing them to be used in other SmartCard environments by other Java Tools.

Application Protocol Data Unit—Management Facility (AMF) uses Java properties files to define information about the APDUs with which it can work. Properties files are plain text key/value files that can be quickly and easily modified to add new APDU definitions or modify existing APDU definitions offline with no changes required to the tool's source code.

Application Protocol Data Unit—Management Facility (AMF) provides an open interface to allow additional plug-ins for defining the information about the types of APDUs that it can work with. This allows a nonJAVA properties file to be used to initialize this information (the plug-in would transform the file's information into the format required by AMF).

Figure 1:
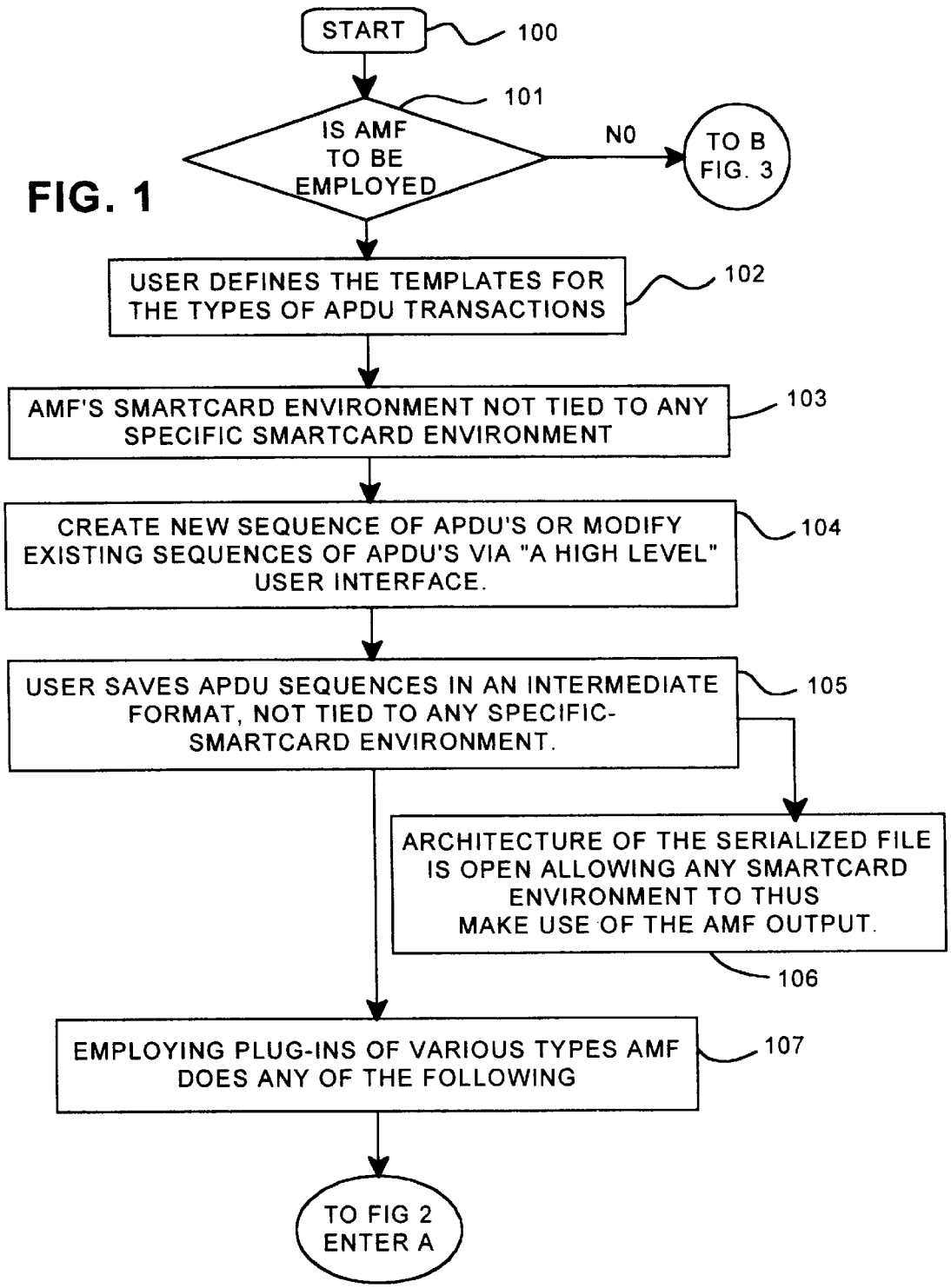
FIG. 1 is a flowchart depicting the process of communicating with a SmartCard employing the Application Protocol Data Unit—Management Facility (AMF), the primary focus of the present invention.

The following represents the process for employing the Application Protocol Data Unit—Management Facility (AMF). FIG. 1 at 100 initiates the process of using APDUs communication with a SmartCard. The first query at 101 that is raised is whether the process is to employ the Application Protocol Data Unit—Management Facility (AMF). If the answer is no, then the process goes to FIG. 3 at 115 where the first step is to create sequences for communication with SmartCard "manually". The next step in the manual process at FIG. 3 at 116 is very tedious, error prone and very slow. The process at 117 is then completed at 118 with all the negative connotations outlined above.

If the answer to query 101 is yes, then the user defines the templates for the type of APDU transactions at 102. The AMF SmartCard environment is not tied to any specific SmartCard environment at 103. The next step in the process 104 involves the creation of a new sequence of APDUs or modifying existing sequences of APDUs via "high level" user interfaces. Then at 105 the user saves APDU sequences in an intermediate format, not tied to any specific SmartCard environment. It is noted at 106 that the architecture of the serialized file is open at this point allowing any SmartCard environment to thus make use of the AMF output.

Returning to the process at FIG. 1 at 107, the process allows the employment of plug-ins of various types and AMF can do any of the following noted in FIG. 2 at 108. At 109 AMF can export the APDU sequences to a specific SmartCard environment, or at 110 AMF can import sequences from specific SmartCard environments into AMF's intermediate format, or at 111, AMF can analyze the execution results from a specific SmartCard environment, or AMF at 112 can initiate communication with a specific SmartCard environment, execute the APDU sequences and show the analyzed results. The final step 113 notes that AMF used in conjunction with SmartCard environments are completed in a very expeditious and simple manner and the process ends at 114.

While the invention has been shown and described with reference to particular embodiments thereof, it will be understood by those skilled in the art that the foregoing and other changes in form and detail may be made therein without departing from the spirit and scope of the invention.

What is claimed is:

1. A computer based system employing an Application Protocol Data Unit—Management Facility (AMF), to communicate with SmartCards, comprising:
    means for managing Application Protocol Data Units (APDUs);
    means for employing said Application Protocol Data Unit—Management Facility as a 100% pure Java tool;
    means for employing said Application Protocol Data Unit—Management Facility (AMF) to create sequences of said Application Protocol Data Units (APDUs) via a high level user interface; and
    said sequences are saved in an intermediate form that is not tied to any specific SmartCard environment, allowing any said SmartCard environment to use APDU—Management Facility (AMF) output.

2. The System of claim 1 wherein said APDU—Management Facility (AMF) system can employ various types of plug-ins to accomplish any or all of the following; export said APDU sequences to a specific SmartCard environment, import sequences from a specific Smart Card environment into said AMF's intermediate format, analyze the execution results from a specific said SmartCard environment, initiate communication with a specific said SmartCard environment and execute APDU sequences, showing the analysis results.

3. The System of claim 1 wherein said SmartCard is JavaCard.

4. The system of claim 1 wherein said Application Protocol Data Unit—Management Facility (AMF) increases productivity when developing data packages to communicate with SmartCards.

5. The system of claim 1 wherein any Application Protocol Data Unit—Management Facility (AMF) includes an export facility whereby the user may export an APDU sequence as a JavaCard 2.0 simulator Script file.

6. The system of claim 1 wherein said AMF is not tied to any SmartCard environment that can be plugged into any SmartCard environment, such as Point of Sale Card terminal and an actual Smartcard implementation, or a PC-based simulator.

7. A computer based method employing an Application Protocol Data Unit—Management Facility (AMF), to communicate with SmartCards, comprising the steps of:
    managing Application Protocol Data Units (APDUs);
    employing said Application Protocol Data Unit—Management Facility as a 100% pure Java tool;
    employing said Application Protocol Data Unit—Management Facility (AMF), to create sequences of said Application Protocol Data Units (APDUs) via a high level user interface; and
    said sequences are saved in an intermediate form that is not tied to any specific SmartCard environment, allowing any said SmartCard environment to use APDU—Management Facility (AMF) output.

8. The method of claim 7 wherein said APDU—Management Facility (AMF) system can employ various types of plugins to accomplish any or all of the following; export said APDU sequences to a specific SmartCard environment, import sequences from a specific SmartCard environment into said AMF's intermediate format, analyze the execution results from a specific said SmartCard environment, initiate communication with a specific said SmartCard environment and execute APDU sequences, showing the analysis results.

9. The method of claim 7, wherein said SmartCard is JavaCard.

10. The method of claim 7 wherein said Application Protocol Data Unit—Management Facility (AMF) increases productivity when developing data packages to communicate with SmartCards.

11. The method of claim 7 wherein any Application Protocol Data Unit—Management Facility (AMF) includes an export facility whereby the user may export an APDU sequence as a JavaCard 2.0 simulator Script file.

12. The method of claim 7 wherein said AMF is not tied to any SmartCard environment that can be plugged into any SmartCard environment, such as Point of Sale Card Terminal and an actual Smartcard implementation, or a PC-based simulator.

13. A computer readable program having data structures included on a computer readable medium which causes the display on a data processor controlled display of a Application Protocol Data Unit—Management Facility (AMF), to communicate with SmartCards, comprising:
    means for managing Application Protocol Data Units (APDUs);
    means for employing said Application Protocol Data Unit—Management Facility as a 100% pure Java tool;
    means for employing said Application Protocol Data Unit—Management Facility (AMF), to create sequences of said Application Protocol Data Units (APDUs) via a high level user interface; and said sequences are saved in an intermediate form that is not tied to any specific SmartCard environment, allowing any said SmartCard environment to use APDU—Management Facility (AMF) output.

14. A computer readable program of claim 13 wherein said APDU—Management Facility (AMF) system can employ various types of plug-ins to accomplish any or all of the following; export said APDU sequences to a specific SmartCard environment, import sequences from a specific SmartCard environment into said AMF's intermediate format, analyze the execution results from a specific said SmartCard environment, initiate communication with a specific said SmartCard environment and execute APDU sequences, showing the analysis results.

15. A computer readable program of claim 13 wherein said SmartCard is JavaCard.

16. A computer readable program of claim 13 wherein said Application Protocol Data Unit—Management Facility (AMF) increases productivity when developing data packages to communicate with SmartCards.

17. A computer readable program of claim 13 wherein any Application Protocol Data Unit—Management Facility (AMF) includes an export facility whereby the user may export an APDU sequence as a JavaCard 2.0 simulator Script file.

18. A computer readable program of claim 13 wherein said AMF is not tied to any SmartCard environment that can be plugged into any SmartCard environment, such as Point of Sale Card Terminal and an actual Smartcard implementation, or a PC-based simulator.

19. A computer system employing an Application Protocol Data Unit—Management Facility (AMF), to communicate with SmartCards, comprising:

mechanism for managing Application Protocol Data Units (APDUs);

mechanism for employing said Application Protocol Data Unit—Management Facility as a 100% pure Java tool;

mechanism for employing said Application Protocol Data Unit—Management Facility (AMF), to create sequences of said Application Protocol Data Units (APDUs) via a high level user interface; and said sequences are saved in an intermediate form that is not tied to any specific SmartCard environment, allowing any SmartCard environment to use APDU—Management Facility (AMF) output.

20. The system of claim 19 wherein said APDU—Management Facility (AMF) system can employ various types of plug-ins to accomplish any or all of the following; export said APDU sequences to a specific SmartCard environment into said AMF's intermediate format, analyze the execution results from a specific said SmartCard environment, initiate communication with a specific said SmartCard environment and execute APDU sequences, showing the analysis results.

* * * * *